United States Patent

[11] 3,578,166

| [72] | Inventors | Peter V. Paulus<br>Port Clinton, Ottawa;<br>Harry W. Green, North Olmsted, Ohio |
|---|---|---|
| [21] | Appl. No. | 807,627 |
| [22] | Filed | Mar. 17, 1969 |
| [45] | Patented | May 11, 1971 |
| [73] | Assignee | The Standard Products Company<br>Cleveland, Ohio |

[54] SEPTIC TANK FOR WASTE DISPOSAL SYSTEM
2 Claims, 4 Drawing Figs.

[52] U.S. Cl. ................................................ 210/110,
210/117, 210/124, 210/538
[51] Int. Cl. ................................................ C02c 1/26
[50] Field of Search ........................................ 210/16,
170, 109, 110, 152, 117, 123, 124, 513, 532, 538

[56] References Cited
UNITED STATES PATENTS

| 947,333 | 1/1910 | Hamilton..................... | 210/16 |
| 2,974,800 | 3/1961 | Fleischmann ................ | 210/16X |

FOREIGN PATENTS

| 597,515 | 8/1925 | France ......................... | 210/16 |
| 125,212 | 4/1919 | Great Britain................ | 210/123 |
| 450,322 | 7/1936 | Great Britain................ | 210/123 |
| 861,936 | 3/1961 | Great Britain................ | 210/220 |

Primary Examiner—Michael Rogers
Attorney—Meyer, Tilberry and Body

ABSTRACT: An improved septic tank having a pair of waste receiving chambers with one chamber being connected to the other by a drain pipe whereby liquid wastes from one chamber may drain over to the other after the bacteriological treatment has been completed.

Patented May 11, 1971

3,578,166

INVENTORS
PETER V. PAULUS
HARRY W. GREEN
BY
Meyer, Tilberry & Body
ATTORNEYS.

SEPTIC TANK FOR WASTE DISPOSAL SYSTEM

This invention relates generally to waste disposal systems adapted for the disposal of human waste and similar waste products and, more particularly, to an improved septic tank for use in such systems.

Although not limited thereto, the septic tank of this invention has particular utility in waste disposal systems of the type adapted to be employed in vehicular units such as buses, trucks, house trailers, mobile homes, marine craft and various other classes of vehicles utilized for human transportation. In addition, the septic tank disclosed herein may also find utility in waste disposal systems of the type employed in domestic housing installations or the like where a conventional sewage system such as those presently in use in most large municipalities is not available.

It is conventional in waste disposal systems to employ a septic tank into which the waste products are deposited for disposal. These waste products may come not only from a toilet but also from wash basins, sinks, showers and other similar facilities which may be employed wherever humans are present. Conventional septic tanks normally comprise a closed receptacle in which the solid materials in the waste products are digestively attacked by anaerobic organisms. As is well known, it is the action of these organisms that reduces the solids and pollutants to a partially purified fluid solution. Thus, the solids deposited in the receptacle settle to the bottom where the anaerobic bacteria attach the solids and convert a considerable volume of the solids to a liquid form. Some of the solids which are lighter than water, float to the surface and contribute to forming a thick layer of grease and scum. Some of this scum will resist anaerobic reduction and it must be removed periodically from the septic tank. Other portions of the scum are subject to the anaerobic action and are reduced in conventional manner. Much of the scum and grease which resists anaerobic reduction may be at least partly decomposed by aerobic microorganisms which, if the treatment tank is aerated, will be present.

There is shown in my prior U.S. Pat. No. 3,342,337 a waste disposal system which is particularly applicable for use in vehicles such as mobile homes. That system includes a conventional septic tank which operates in the manner described above to reduce the solid waste products to a fluid solution. As contemplated by that system, the fluid solution in the septic tank is withdrawn from the septic tank and transmitted to a boiler unit which employs the waste heated gases of the vehicle engine to vaporize the liquid and thereby purify it.

Although the conventional septic tank is generally satisfactory for use in systems such as that disclosed in the aforesaid patent, these septic tanks do present some shortcomings. For example, at any given moment, the liquid withdrawn from the tank may be a mixture of water form the kitchen sink, water from the shower and a combination of urine and particles of human excrement. Some of these components may have been in the tank a sufficient period to be fully treated while other of these components may be in varying degrees of decomposition and purification. Although this mixture of variously treated fluids will be purified when vaporized, it is desirable from several standpoints to have the waste products and particularly those from the toilet, as completely treated by the aerobic and anaerobic microorganisms as possible before vaporization.

However, a factor particularly pertinent in vehicular waste disposal systems in addition to complete bacteriological treatment of the waste products is the desirability of withdrawing the liquid from the tank whenever the vehicle engine is operating thereby to make optimum use of the heated gases in vaporizing the liquid waste materials. Thus, on the one hand, it is desireable to retain the waste materials in the tank as long as possible to obtain the full benefit of the bacterial action while, on the other hand, to obtain maximum efficiency of the waste disposal system, it may be necessary to withdraw liquid from the tank at irregular intervals.

It is the principal object of this invention to provide an improved septic tank construction which permits withdrawal of waste liquids at any time while yet assuring sufficient bacteriological treatment of the waste products.

In accordance with the principal aspect of this invention, there is provided an improved septic tank which has a first chamber adapted for the conventional bacteriological treatment of waste products and a second chamber separated from the first. The first chamber is adapted to receive waste products, such as those from the toilet, requiring substantial treatment while the second chamber is adapted to receive waste products from sources such as a shower or basins which require very little or no bacteriological treatment prior to vaporization. The two chambers are interconnected in a manner such that only clear effluent will be discharged from the first chamber into the second and the second chamber is connected to the waste disposal system in which the liquid waste products are vaporized.

In accordance with a more specific aspect of the invention, the improved septic tank includes a common wall between the two chambers with a drain pipe extending through the wall and interconnecting the two chambers. The drain pipe is positioned above the level of sludge normally present in the first chamber and beneath the scum which collects at the surface of the liquid in that chamber thereby enabling the clear effluent to pass through the drain pipe into the second chamber.

In accordance with another specific aspect of the invention, there is provided liquid level sensing means in the first chamber of the tank, which liquid level sensing means controls a valve in the drain pipe between the two chambers, thus assuring that only after the level in the first tank has reached a certain point will the effluent be permitted to drain over into the second tank.

It is an object of this invention to provide an improved septic tank for use in a waste disposal system.

It is a further object of this invention to provide an improved septic tank which is particularly suitable for use in waste disposal systems incorporated in vehicular units.

Another object of the invention is to provide an improved waste disposal system for vehicular units.

Other objects and features of the invention will become more apparent upon a complete reading of the following description which, together with the attached drawings, describes one preferred embodiment of the invention.

Referring now to the drawings wherein like reference numerals indicate like parts in the various views.

Figure 1:
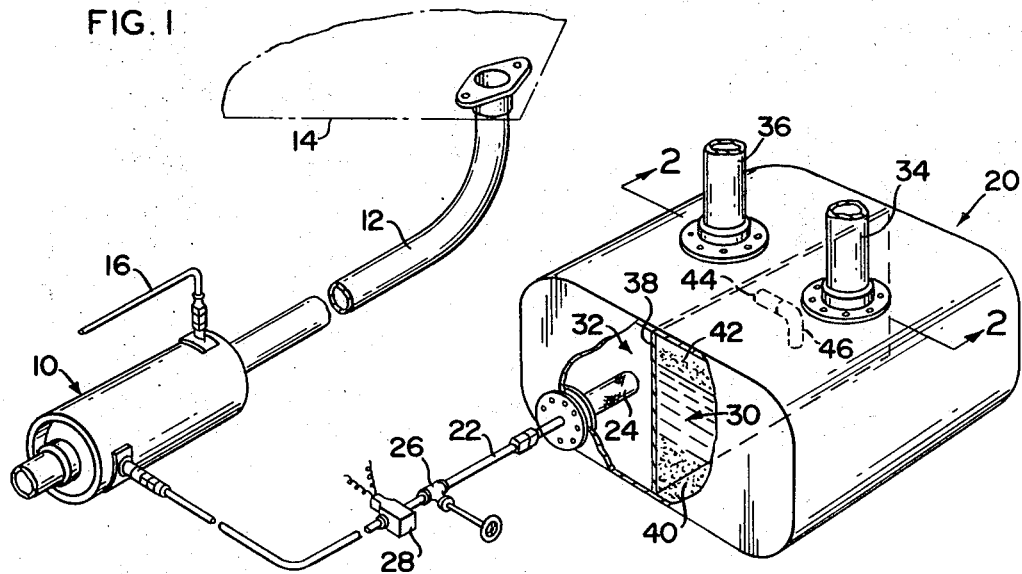
FIG. 1 is a schematic perspective view of a waste disposal system employing the septic tank of this invention.

Referring now to FIG. 1, the septic tank of the present invention is illustrated as adapted for use with a waste disposal system of the type generally disclosed in my prior U.S. Pat. No. 3,342,337. Reference may be had to that prior patent for a complete disclosure of the system it being sufficient for this disclosure only to outline in general the elements of the system. Thus, the system comprises a boiler unit 10 in the form of a drum received over the exhaust pipe 12 leading from an engine 14. The interior of the drum 10 forms a heating chamber into which waste liquids from a septic tank may be introduced with the liquid being heated by the hot exhaust gases passing from the engine 14 through the exhaust pipe 12. The heating of the liquid causes the liquid to vaporize and the vapors pass out of the boiler drum 10 through a conduit 16 which, as shown in that patent, is connected to the exhaust pipe at a point downstream where the vaporized waste materials are mixed with the hot exhaust gases and discharged into the atmosphere.

It is to be understood that other forms of boiler units may be employed with the septic tank to be described hereinafter.

Moreover, it should also be appreciated that the septic tank may be used with methods other than boiling and vaporization as the final treatment of the the effluent.

In accordance with this invention, there is provided in lieu of the conventional septic tank an improved septic tank indicated generally by the reference numeral 20 which is connected by a conduit 22 with the boiler drum 10. This outlet conduit is connected at one end to the waste tank or septic tank 20 by a suitable filter 24 which is located inside the tank. The filter 24 defines a liquid level spaced above the floor of the tank so that any solids in the tank may collect on the bottom and not be passed through the conduit 22. Positioned in the conduit may be a suitable shutoff valve 26 and an inline liquid metering pump 28 of a suitable construction which functions to draw liquid from the tank 20 and direct it to the boiler drum 10. The pump 28 may be actuated by any of a plurality of automatic or manual means and serves as a valve when it is not operating in that it restrains the flow of liquid from the tank to the boiler drum.

Turning now to the construction of the improved septic tank, it is contemplated that the septic tank may be constructed from any of a variety of suitable materials. However, in accordance with the invention the tank is divided into two compartments, a first chamber 30 and a second chamber 32. An inlet conduit 34 is in communication with the chamber 30 and an inlet conduit 36 is in communication with the chamber 32. A wall 38 in the interior of the tank 20 is common to both the chambers 30, 32.

It is contemplated that the inlet pipe 34 will be connected to a source of waste products such as the toilet and the sink while the conduit 36 will be connected to another source of waste products such as the shower. Thus, it is contemplated that the tank 30 will receive waste products having a high percentage of pollutants which require substantial bacteriological treatment before being discharged, while on the other hand, the tank 32 will receive waste products with a low percentage of pollutants and, hence, require only a minimum of treatment, if any, before being discharged.

The chamber 30 is designed to function as a separate conventional septic tank within the tank 20. Thus, it is contemplated that waste materials will be deposited in the chamber 30 through the conduit 34 with the settleable solids sinking to the bottom where they form a layer of sludge, schematically illustrated in FIG. 2 at 40. The solids which are lighter than water float to the surface together with a certain amount of grease and scum which, as mentioned above, normally accumulates to form an upper layer in the tank indicated by the numeral 42. In between the upper layer 42 and the sludge 40 there is a relatively clear stratum of liquid. The anaerobic action which occurs in conventional septic tanks also occurs in chamber 30 so that the volume of sludge 40 is reduced to a considerable extent. In addition, the floating solids as well as a certain amount of the grease and scum are reduced by the anaerobic action in the layer 42. Further reduction of this grease and scum may be accomplished by aerobic action if the tank is sufficiently aerated to support the presence of aerobic microorganisms.

Figure 2:
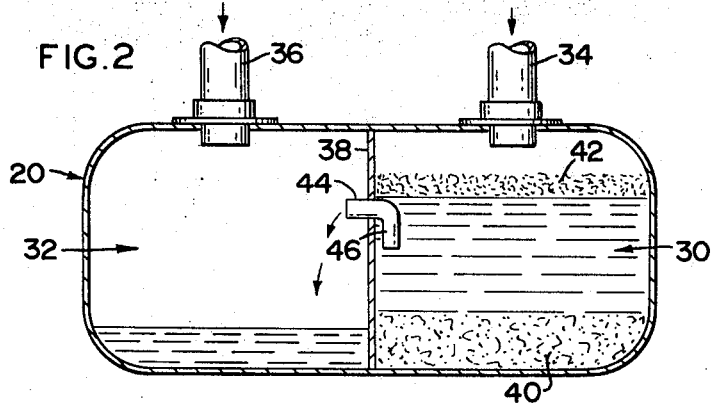
FIG. 2 is a sectional view through the septic tank along line 2–2 of FIG. 1.

As is apparent from FIG. 2, there normally is a substantial quantity of relatively clear liquid between the layer of sludge 40 and the upper layer 42, with this layer comprising, in large part, liquid waste material that has been subjected to a complete bacteriological treatment and, hence is in condition for final disposal. In accordance with this invention, this layer of relatively clear effluent is drained from chamber 30 over into chamber 32 by a drain pipe 44 which extends through the wall 38. This drain pipe 44 is generally elbow-shaped in configuration with one arm 46 of the elbow being directed in a generally downward direction in chamber 30. As is apparent from FIG. 2, the drain pipe 44 is positioned well above the layer of sludge 40 with the downwardly directed arm 46 being positioned well below the surface of the liquid in chamber 30. In this manner only clear effluent is drained from chamber 30. To assure that no solid particles are passed through pipe 44, a screen or filter also may be used with the pipe.

It will be appreciated that as the level of liquid in chamber 30 diminishes, a point will be reached wherein the layer of grease and scum 42 will substantially coincide with the position of drain pipe 44. In this condition, the downturned arm 46 will extend beneath the layer os scum but no liquid will be withdrawn from the chamber since there is an insufficient hydrostatic head to force the liquid through the pipe over into chamber 32.

As the clear effluent is withdrawn from chamber 30, it is intermixed with the water in chamber 32 and may be, if desired, subjected to further treatment such as by chemical action or by irradiation. In any event, the liquid contents of chamber 32 are periodically withdrawn through the outlet conduit 22 by the pump 28 and injected into the boiler drum 10 where the liquid is vaporized and discharged into the exhaust system of the vehicle.

With the described arrangement, several advantages are achieved. Thus, it is unnecessary, as a general matter, to subject the water from a shower, for example, to the same bacteriological treatment as the waste products from the toilet. Accordingly, it is possible to operate the waste disposal system to dispose of the shower water in chamber 32 before the waste products in chamber 30 are ready for disposal. This is particularly important in waste disposal units for vehicles in which the system is dependent on operation of the vehicle itself. By dividing the septic tank into different chambers based on the amount of bacteriological treatment required for the waste products, it is possible that there will always be some waste materials to be disposed of whenever the vehicle is operated while leaving other waste products to be treated and disposed of during subsequent operations of the vehicle. Moreover, the efficiency of the waste disposal system is improved since the possibility of suspended solids and other foreign materials entering the disposal system is reduced due to the draining only of the clear effluent from the chamber 30 into the chamber 32, leaving the solids in that chamber for further treatment by the bacteria in the tank.

Figure 3:
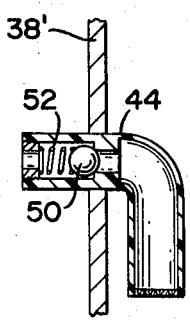
FIG. 3 is a fragmentary sectional view showing a valve in the pipe interconnecting the two chambers of the septic tank.

Various modifications may be made to the basic arrangement just described. For example, it may be desirable to employ a flow control valve in combination with the drain pipe 44 as a means of positive control over the flow of liquid through the pipe. One such valve is illustrated in FIG. 3 and comprises a simple check valve. Thus, the drain pipe 44' is substantially of the same configuration as that illustrated in FIG. 2; however, incorporated in the passage in the drain pipe is a ball check valve comprising a ball check 50 biased by a spring 52 into engagement with a valve seat. It will be appreciated that before any liquid may flow through the drain pipe 44' there must be sufficient hydrostatic pressure on the fluid to overcome the bias of the spring 52 and unseat the valve 50.

Figure 4:
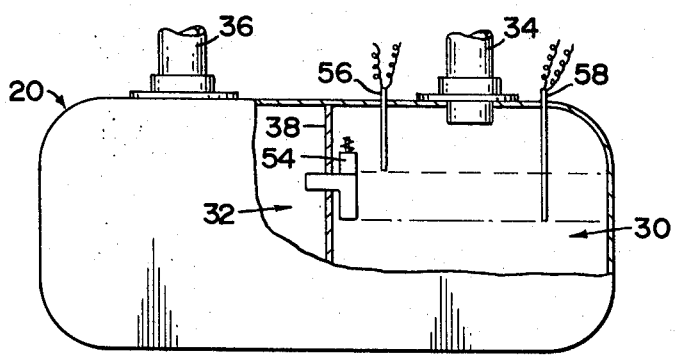
FIG. 4 is a fragmentary sectional view of the septic tank showing a further modification of the valve interconnecting the two chambers.

A further modification of the drain pipe and valve combination is schematically illustrated in FIG. 4 wherein a solenoid operated valve 54 of a conventional configuration is positioned in the wall 38. The operation of this solenoid operated valve may be either manually controlled or by a pair of liquid level sensing probes 56,58 which protrude into the chamber 30 with these probes being connected through appropriate electrical leads to the solenoid operated valve 54. With this arrangement, the valve 54 is operated by the probe 56 when the liquid level in chamber 30 reaches a certain predetermined point and the probe 58 is operative to deactivate the solenoid valve 54 when the liquid level in the chamber 30 drops to a predetermined level.

We claim:

1. A waste tank having first and second chambers, an inlet opening in said tank to said first chamber, an inlet opening in said tank to said second chamber, an outlet opening in said tank for said second chamber, said first chamber having an upper portion and a lower portion, a connecting conduit connecting said first and second chambers, said connecting conduit having an inlet end and an outlet end, said inlet end being positioned in said first chamber intermediate said upper and lower portions, said outlet end being positioned in said second chamber, said connecting conduit including flow control means responsive to liquid level in said first chamber for transferring liquid to said second chamber from a position substantially below the surface of liquid in said first chamber only when the surface of a liquid in said first chamber is substantially above the inlet end, said flow control means including valve means in said connecting conduit and sensing means for sensing the liquid level in said first chamber, said said sensing means cooperating with said valve means for selectively opening and closing said valve means responsive to changes in the liquid level in said first chamber.

2. A waste tank having first and second chambers, an inlet opening in said tank to said first chamber, an inlet opening in sad tank to said second chamber, an outlet opening in said tank for said second chamber, said first chamber having an upper portion and a lower portion, a connecting conduit connecting said first and second chambers, said connecting conduit having an inlet end and an outlet end, said inlet end being positioned in said first chamber intermediate said upper and lower portions, said outlet end being positioned in said second chamber, said connecting conduit including flow control means responsive to liquid level in said first chamber for transferring liquid to said second chamber from a position substantially below the surface of liquid in said first chamber only when the surface of a liquid in said first chamber is substantially above said inlet end, said inlet opening to said first chamber being connected with a first source of waste products having a high percentage of pollutants and said inlet opening to said second chamber being connected with a second source of waste products having a low percentage of pollutants, said flow control means including valve means in said connecting conduit and sensing means for sensing the liquid level in said first chamber, said sensing means cooperating with said valve means for selectively opening and closing said valve means responsive to changes in the liquid level in said first chamber.